E. RAPATTONI.
ENGINE SILENCER.
APPLICATION FILED DEC. 26, 1918.
1,333,676. Patented Mar. 16, 1920.
3 SHEETS—SHEET 1.
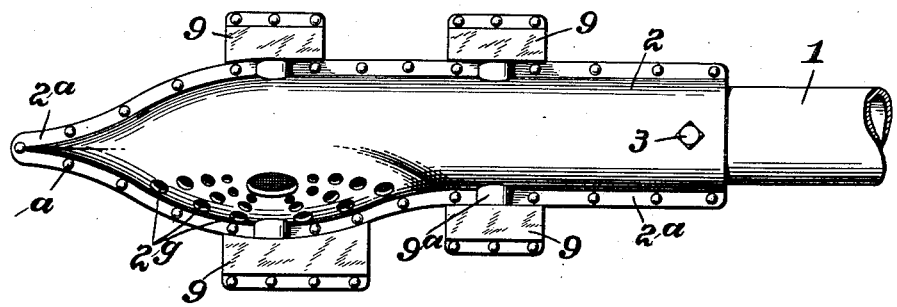
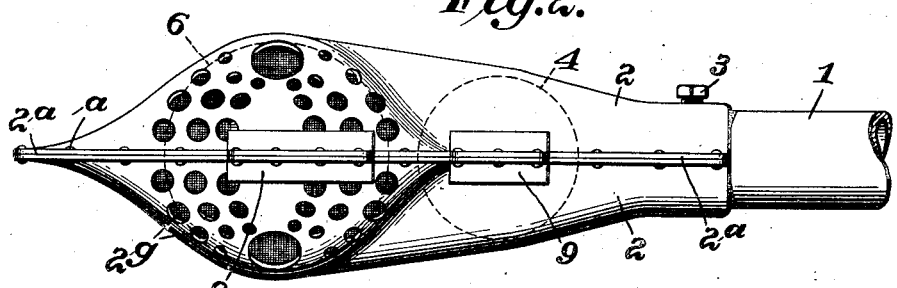
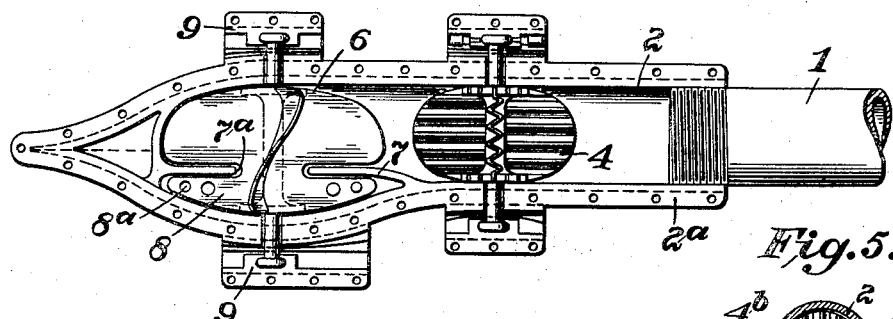
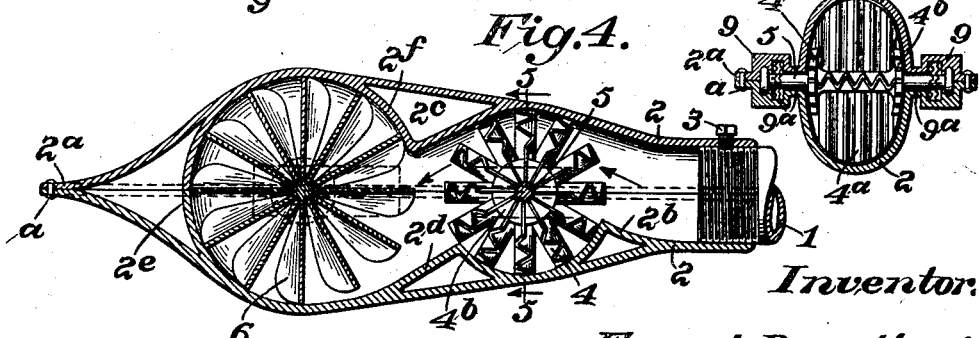
Inventor:
Ernest Rapattoni,
by Shear Middleton Donaldson & Shear
Atty's.

E. RAPATTONI.
ENGINE SILENCER.
APPLICATION FILED DEC. 26, 1918.

1,333,676.

Patented Mar. 16, 1920.
3 SHEETS—SHEET 2.

Inventor:
Ernest Rapattoni,
by Munn Middleton Donaldson Spear
Atty's.

E. RAPATTONI.
ENGINE SILENCER.
APPLICATION FILED DEC. 26, 1918.
1,333,676. Patented Mar. 16, 1920.
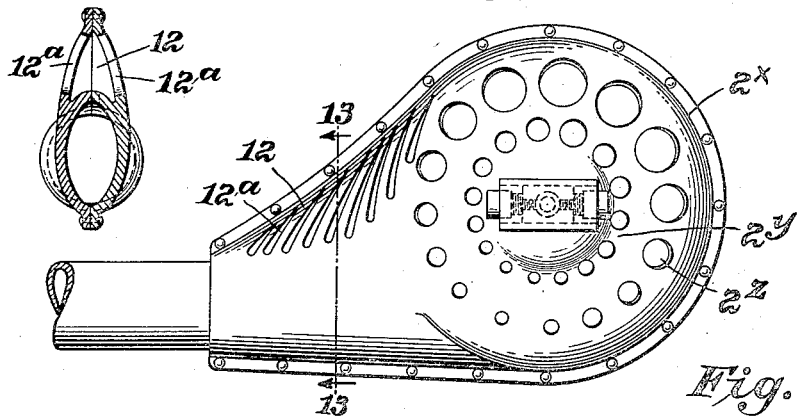
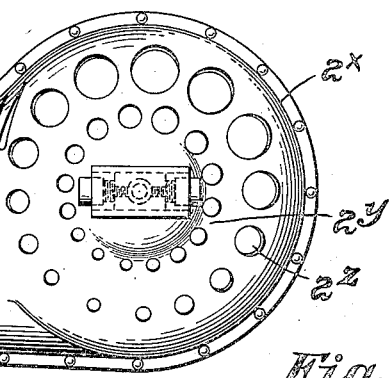
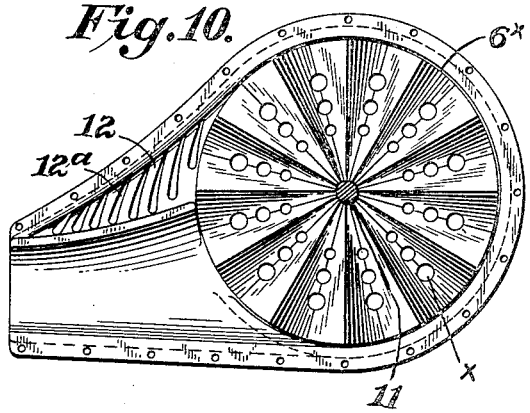
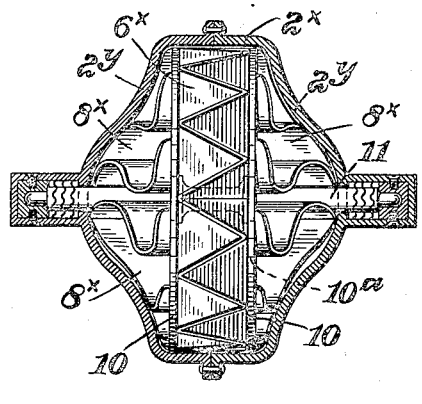
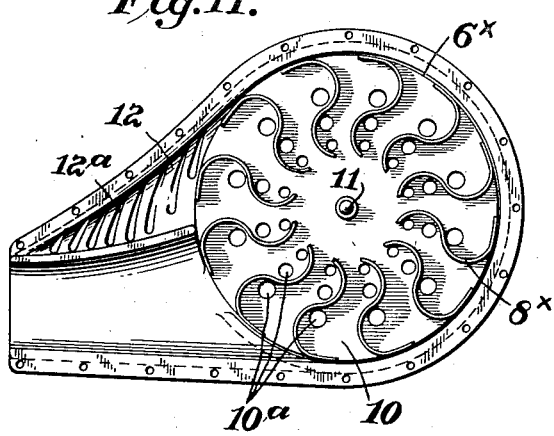
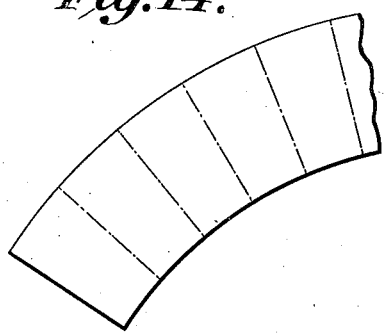
Inventor:
Ernest Rapattoni,
by Spear Middleton Donaldson Spear
Atty's.

UNITED STATES PATENT OFFICE.

ERNEST RAPATTONI, OF NORTH PLYMOUTH, MASSACHUSETTS.

ENGINE-SILENCER.

1,333,676.     Specification of Letters Patent.     Patented Mar. 16, 1920.

Application filed December 26, 1918. Serial No. 268,342.

*To all whom it may concern:*

Be it known that I, ERNEST RAPATTONI, a subject of the King of Italy, but who has declared his intention of becoming a citizen of the United States, and resident of North Plymouth, Massachusetts, have invented certain new and useful Improvements in Engine-Silencers, of which the following is a specification.

My present invention relates to improvements in silencers for the exhaust pipes of engines, and is especially designed for meeting the requirements of airplane engines, though not limited to such use.

One of the objects of the invention is to provide a construction which will convert the impulses or puffs of the exhaust into a steady current of hot fluid which will be materially checked before reaching the outlet of the apparatus, and in which the gases will finally emerge from or be driven into the atmosphere in such a manner as to cause no sound waves to be produced.

Another object is to provide a construction which will have an efficient silencing action without producing any back pressure on the engine with consequent loss of power.

A further object is to devise a construction which shall be light in weight and compact in shape and designed to offer a minimum resistance to the air when carried therethrough at high speeds.

Still another object is to provide bearings for the rotary parts which will be kept from overheating, thereby materially lengthening the life time of the silencer.

With these and other objects in view the invention includes the novel features of construction and arrangement and combination of parts hereinafter described and particularly defined by the appended claims.

In the accompanying drawings I have shown three embodiments of my invention designed respectively for an airplane engine, a motorcycle, and an automobile engine, the underlying principle in all of these being the same, but the structure being modified to meet the requirements of such particular type of engine or conveyance driven thereby.

In these drawings;

Figure 1 is a plan view of a silencer of the air-plane type.

Fig. 2 is a side elevation of the same.

Fig. 3 is a plan view of the lower half of the casing, the upper half being removed.

Fig. 4 is a central longitudinal section at right angles to the line of division between the sections.

Fig. 5 is a transverse section on line 5—5 of Fig. 4.

Fig. 9 is a side elevation of a further modificiation, especially adapted for automobile engines.

Fig. 10 is a view with one of the sections and division plates removed.

Fig. 11 is a similar view with the division plate and blades carried thereby in place.

Fig. 12 shows the casing in transverse section and the rotary parts in elevation.

Fig. 13 is a section on line 13—13 of Fig. 9, and

Fig. 14 is a diagrammatic view.

Figure 6:
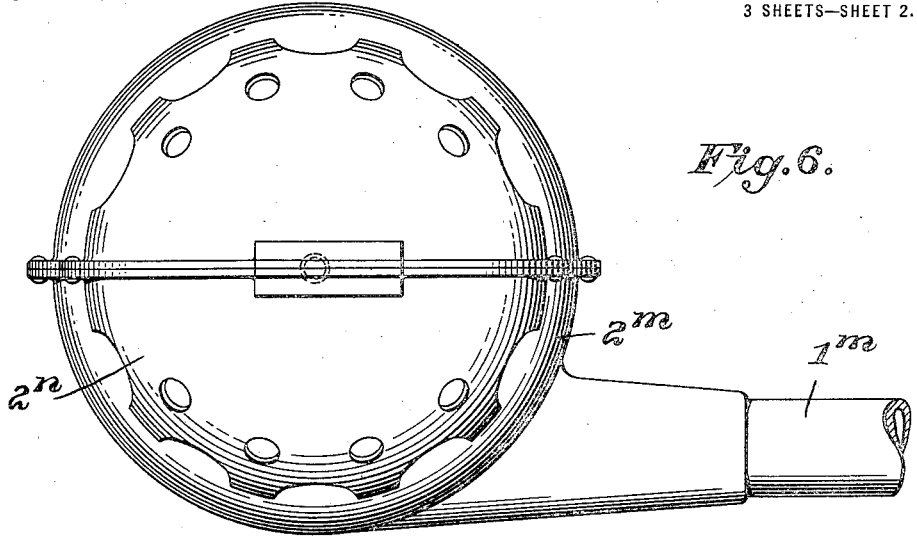
Fig. 6 is a side elevation of a modification designed more especially for motorcycles.

Referring by reference characters to this drawing and considering first the form shown on Sheet 1, the numeral 1 designates the exhaust pipe of an engine, and 2 the two halves or sections constituting the silencer casing, which are secured together in any suitable manner, conveniently by the provision of marginal flanges $2^a$ connected by rivets $a$.

The silencer may be secured upon or to the exhaust pipe in any desired manner, an example of such means being shown as internal threads on the neck of the silencer engaging corresponding threads on the exhaust pipe, the parts being locked together by a set screw 3.

To reduce the resistance of the air to a minimum I make the neck of the silencer of approximately the size of the exhaust pipe from which point the casing flares or enlarges gradually to provide the necessary space for the contained parts and silencer action, whence the casing contracts again or tapers to a point as clearly shown in Figs. 1 and 2.

Within the initial portion of the casing I prefer to place an impact wheel 4 to initially break up the puffs and equalize the flow of gases, and a form of wheel I have found efficient for this purpose is that shown in Figs. 3 to 5 provided with blades extending transversely of the casing and which are fluted or corrugated longitudinally, as indicated at $4^a$.

These blades are preferably formed of fluted sheet metal having the edges suitably secured in grooves or slots in disks $4^b$ carried by the shaft 5.

To cause the exhaust fluid to act on the blades on one side of the axis of the impact wheel I provide an inwardly curved shoulder or abutment $2^b$ on the opposite side nearest the exhaust pipe, and I also provide downwardly inclined walls $2^c$ and $2^d$ which deflect the exhaust fluid to the opposite or underside of the second bladed rotor or element, which is designated 6.

This rotates in a nearly cylindrical casing formed in part by the curved exterior walls of the casing sections and in part by the inner walls $2^d$, $2^e$ and $2^f$, the latter of which meets the wall $2^c$ all as clearly shown in Fig. 4.

Disposed longitudinally within that part of the casing which contains the rotor or turbine 6 is a partition 7 which divides the casing into two compartments, a main compartment which contains the rotor or turbine 6 and which receives the exhaust and a supplemental or side compartment which contains another rotor or turbine 8 and which receives the exhaust from the main chamber through a passageway $7^a$. From the side compartment the exhaust discharges to the atmosphere through a plurality of holes or perforations $2^g$ preferably of varying size, as shown in Figs. 1 and 2.

I prefer to make the blades of the rotors 6 and 8 integral and provide them with radial slits which receive the partition 7, as shown in Fig. 3. The blades are of spiral formation as shown, this formation being continued in the blades 8 and the arrangement is such that as the blades 6 revolve they tend to further reduce the puffs or pulsations in the stream of gas which is discharged through the opening $7^a$ into the supplemental compartment. As the blades 8 sweep around over the perforated surface of the casing the exhaust fluid is mingled with the atmosphere in a plurality of small steady streams which are incapable of producing sound waves. The shape of the blades described causes the exhaust to be drawn from the main chamber and discharged through the supplemental chamber with a cork screw or spiral action.

I have found that beneficial effects are secured by providing the blades 8 with holes or perforations, as shown at $8^a$.

One objection heretofore experienced with rotary devices in silencers has been the overheating and consequent speedy destruction of the bearings. This I overcome by extending the shafts for a material distance outside the casing and providing offset bearings 9 which will be kept at reduced temperature by the air currents, the bearing casings being connected to the casing by reduced portions or necks $9^a$ so that the bearings are almost surrounded by air.

I prefer to form the bearings split on the same lines as the casing, so that by separating the sections of the casing the shafts and rotors may be readily removed for repair or replacement.

Figure 7:
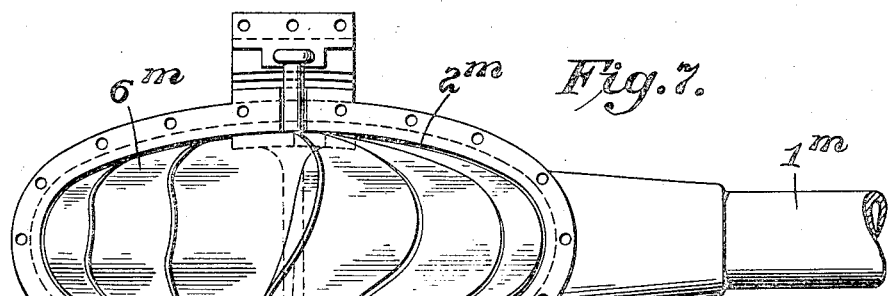
Fig. 7 is a plan view with part of one of the casing sections broken away.
Figure 8:
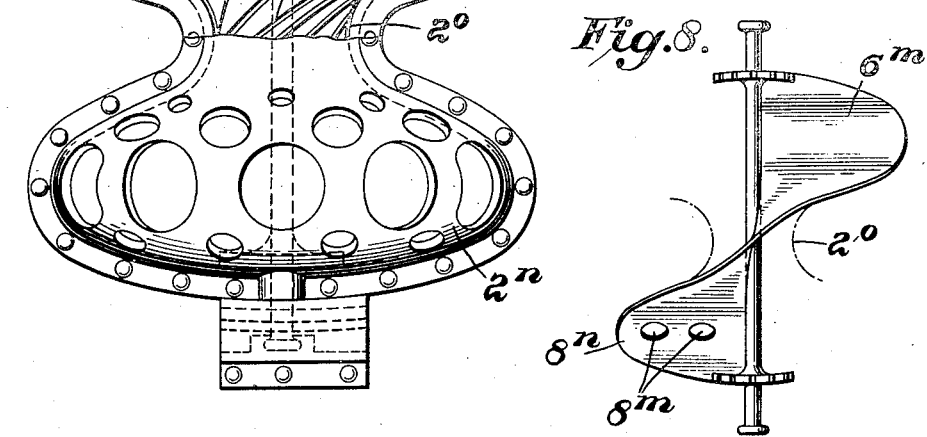
Fig. 8 is a detail view.

In Figs. 6, 7 and 8 I have shown a form which I deem specially adapted for motorcycles.

In this the casing is shaped to form a main exhaust receiving chamber $2^m$ and a supplemental chamber $2^n$ connected therewith by a narrow neck which serves the same purpose as the passageway $7^a$ in the partition 7 (Fig. 3).

The chamber $2^m$ receives the exhaust from pipe $1^m$ and contains the turbine or rotor $6^m$ while the chamber $2^n$ contains the turbine or rotor $8^n$, this latter chamber having exit openings communicating with the atmosphere. In this form also the blades of the two rotors are integral, being narrowed where they pass through the constricted portion $2^o$, the detail blade construction being shown in Fig. 8. The blades $8^n$ are preferably provided with holes or perforations, as indicated at $8^m$.

In Figs. 9 to 14 I have shown a form which I regard as specially suited to automobiles, and utilize a double discharge to the atmosphere. To this end I provide a casing having a central substantially cylindrical portion $2^x$ containing the main turbine or rotor $6^x$ and two side portions $2^y$ containing the supplemental rotors or turbines $8^x$, the walls of the latter having openings to the atmosphere, as indicated at $2^z$.

The chamber for the main turbine is divided from the supplemental side chambers by two circular disks 10, which are provided with holes or perforations $10^a$ for the passage of the exhaust. In this form I have made the partitions in the shape of rotary disks secured to the shaft 11, and the turbine $6^x$ in the shape of blades zigzagging back and forth between the two disks to which they are secured. A convenient manner of forming the blades is by folding a curved sheet of metal on the broken lines, as indicated in Fig. 14.

The blades $6^x$ are perforated at their angles or corners to aline with openings in the disks 10, as indicated at $x$.

The side blades $8^x$ are carried by the outer faces of the disks 10 and are preferably of the shape shown in Fig. 11.

I prefer also in this form the casing flaring at its neck and provide therein a chamber 12 communicating at its rear end with the main turbine chamber and having air passages $12^a$ in its walls.

What I claim is:

1. In an engine silencer, a casing adapted to receive the exhaust and having a partition with a central aperture forming two compartments, said casing having openings in its wall placing one compartment in communication with the atmosphere, a rotary bladed element in each chamber, said blades having continuous reduced connecting blade portions extending through the said central aperture and said rotary elements having their axes in alinement.

2. In an engine silencer, an elongated casing tapered at both ends and having means at one end for connection with an exhaust pipe, said casing having a longitudinal perforate partition forming two chambers, said casing having openings placing one chamber in communication with the atmosphere, and said partition a central opening and a rotary bladed element in each compartment, said elements being connected to rotate in unison by blade portions extending through said central opening.

3. In an engine silencer, an elongated casing tapered at both ends and having means at one end for connection with an exhaust pipe, said casing having a flat longitudinal perforate partition disposed in a plan parallel with the major axis of the casing forming two chambers, said casing having openings placing one chamber in communication with the atmosphere, and a rotary bladed element in each compartment, said elements being connected to rotate in unison, and a rotary bladed element between said just named elements and the intake end of the casing.

4. An engine silencer comprising an elongated casing having one end adapted to an exhaust pipe in axial alinement therewith, said casing being flared from said end and then tapered to its opposite end, and a plurality of discharge openings in the bottom wall only of the portion of greatest diameter the remaining portion of said casing being imperforate.

5. In an engine silencer, an elongated casing tapered at both ends and of substantially oval shape in cross section, one of the faces of the oval being provided with a plurality of perforations, said casing having a longitudinal partition with a central opening, and a rotary bladed element journaled in said casing, said blades having their outer portions provided with narrow slits receiving said partition.

6. In an engine silencer, an elongated casing having a plurality of lateral discharge openings near its rear end, a spirally bladed element coöperating with said discharge openings, and a rotary element nearer the inlet end of said casing having transversely corrugated blades.

In testimony whereof I affix my signature.

ERNEST RAPATTONI.